United States Patent
Fume et al.

(10) Patent No.: US 10,540,987 B2
(45) Date of Patent: Jan. 21, 2020

(54) SUMMARY GENERATING DEVICE, SUMMARY GENERATING METHOD, AND COMPUTER PROGRAM PRODUCT

(71) Applicant: Kabushiki Kaisha Toshiba, Minato-ku, Tokyo (JP)

(72) Inventors: Kosei Fume, Kawasaki Kanagawa (JP); Taira Ashikawa, Kawasaki Kanagawa (JP); Masayuki Ashikawa, Kawasaki Kanagawa (JP); Takashi Masuko, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/416,973

(22) Filed: Jan. 26, 2017

(65) Prior Publication Data
US 2017/0270949 A1    Sep. 21, 2017

(30) Foreign Application Priority Data

Mar. 17, 2016   (JP) .................. 2016-054331

(51) Int. Cl.
*G10L 21/10*   (2013.01)
*G10L 15/02*   (2006.01)
(Continued)

(52) U.S. Cl.
CPC ............ *G10L 21/10* (2013.01); *G06F 16/345* (2019.01); *G06F 17/211* (2013.01);
(Continued)

(58) Field of Classification Search
CPC ....... G10L 21/10; G10L 15/265; G10L 15/02; G06F 17/2755; G06F 17/211
See application file for complete search history.

(56) References Cited

U.S. PATENT DOCUMENTS 5,778,397 A * 7/1998 Kupiec ............. G06F 17/30719
  704/1
7,272,558 B1 * 9/2007 Soucy .................. G10L 15/063
  704/235
(Continued)

FOREIGN PATENT DOCUMENTS

JP   H08-194492 A   7/1996
JP   2006-081005 A  3/2006
(Continued)

OTHER PUBLICATIONS

Sanderson et al., "Deriving concept hierarchies from text," Massachusetts Univ Amherst Dept of Computer Science. (Year: 2005).*

*Primary Examiner* — Daniel C Washburn
*Assistant Examiner* — Oluwadamilola M Ogunbiyi
(74) *Attorney, Agent, or Firm* — Knobbe, Martens, Olson & Bear, LLP

(57) ABSTRACT

A summary generating device includes a featural script extracting unit, a segment candidate generating unit, and a structuring estimating unit. The featural script extracting unit extracts featural script information of the words included in text information. Based on the extracted feature script information, the segment candidate generating unit generates candidates of segments that represent the constitutional units for the display purpose. Based on the generated candidates of segments and based on an estimation model for structuring, the structuring estimating unit estimates structure information containing information ranging from information of a comprehensive structure level to information of a local structure level.

10 Claims, 10 Drawing Sheets

| TEXT FEATURE | | APPEARANCE OF PART-OF-SPEECH PROPERTY/MEANING CLASS | | | | |
|---|---|---|---|---|---|---|
| p ts='15:04:25' | TODO | DATE | PERSON | OBJECT {2} | ACTION | |
| p ts='15:04:40' | | PERSON | DATE | OBJECT {2} | ORG | ACTION |
| p ts='15:05:01' | | PERSON | OBJECT | ACTION | DATE | |
| p ts='15:05:10' | | MEETING | DATE | TIME | PLACE | |
| p ts='15:05:13' | TERMINATE {2} | | | | | |

(51) Int. Cl.
*G10L 15/26* (2006.01)
*G06F 17/27* (2006.01)
*G06F 17/21* (2006.01)
*G10L 25/78* (2013.01)
*G06F 16/34* (2019.01)
*G10L 15/22* (2006.01)

(52) U.S. Cl.
CPC .......... *G06F 17/2755* (2013.01); *G10L 15/02* (2013.01); *G10L 15/265* (2013.01); *G10L 25/78* (2013.01); *G10L 2015/221* (2013.01)

(56) References Cited

U.S. PATENT DOCUMENTS

| | | | |
|---|---|---|---|
| 7,373,597 B2* | 5/2008 | Hagerty | G06F 17/218 715/205 |
| 8,825,478 B2 | 9/2014 | Cox et al. | |
| 9,020,808 B2* | 4/2015 | Branton | G06F 16/345 704/9 |
| 9,070,369 B2 | 6/2015 | Cox et al. | |
| 9,483,532 B1* | 11/2016 | Zhang | G06F 17/30663 |
| 2003/0217335 A1* | 11/2003 | Chung | G06F 17/2785 715/206 |
| 2005/0125216 A1* | 6/2005 | Chitrapura | G06F 17/2785 704/1 |
| 2006/0167930 A1* | 7/2006 | Witwer | G06F 16/355 |
| 2008/0228789 A1* | 9/2008 | Asakawa | G06F 17/2247 |
| 2010/0070276 A1* | 3/2010 | Wasserblat | G10L 15/18 704/243 |
| 2010/0174979 A1* | 7/2010 | Mansfield | G06F 17/211 715/234 |
| 2010/0195909 A1* | 8/2010 | Wasson | G06F 17/241 382/176 |
| 2011/0301945 A1* | 12/2011 | Ichikawa | G10L 15/02 704/211 |
| 2012/0011428 A1* | 1/2012 | Chisholm | G06F 17/241 715/230 |
| 2013/0086458 A1* | 4/2013 | Kurata | G06T 11/60 715/202 |
| 2014/0016867 A1* | 1/2014 | Maurer | G06F 17/211 382/182 |
| 2014/0188935 A1* | 7/2014 | Vee | G06F 16/243 707/771 |
| 2014/0325407 A1* | 10/2014 | Morris | G06F 3/04842 715/765 |
| 2014/0350930 A1* | 11/2014 | Cox | H04L 12/1822 704/235 |
| 2015/0194153 A1 | 7/2015 | Lee et al. | |
| 2015/0363954 A1* | 12/2015 | Maurer | G06T 11/60 345/473 |
| 2018/0144188 A1* | 5/2018 | Evanitsky | G06K 9/00469 |

FOREIGN PATENT DOCUMENTS

| | | |
|---|---|---|
| JP | 2013-011744 | 1/2013 |
| JP | 2013-120547 A | 6/2013 |
| JP | 2015-015632 A | 1/2015 |
| JP | 2015-130176 A | 7/2015 |
| JP | 2015-138103 A | 7/2015 |
| WO | WO 2005/122002 | 12/2005 |
| WO | WO 2011/099086 A1 | 8/2011 |

* cited by examiner

FIG.4

15:04:20 UM, WE ARE RUNNING OUT OF TIME. LET US SUMMARIZE. IS IT OK WITH ALL?
15:04:25 FIRSTLY, REGARDING THE TO-DO LIST, MR. NISHIGUCHI WILL CREATE A DRAFT PROPOSAL OF SPECIFICATIONS BY THE 10-TH DAY OF THE MONTH.
15:04:40 MR. SAGAWA, BY THE 8-TH DAY OF THE MONTH, PLEASE CHECK WITH THE THIRD DEVELOPMENT DEPARTMENT ABOUT THE API OF THE Z MODULE.
15:05:01 MS. TAJIMA, WE WILL LEAVE THE MEMORY USAGE REVIEW TO YOU. CAN IT BE COMPLETED BY NEXT WEEK? OK, BY THE 14-TH DAY OF THE MONTH.
15:05:10 WELL, THE NEXT MEETING IS SCHEDULED ON FEBRUARY 14 AT 10 AM IN THE MEETING ROOM C.
15:05:13 THAT'S ENOUGH FOR TODAY. WE WILL END THE MEETING.

FIG.5

/UM/,/ WE/ ARE/ RUNNING/ OUT/ OF/ TIME/./ LET/ US/ SUMMARIZE/. IS/ IT/ OK/ WITH/ ALL/?/
/FIRSTLY/,/ REGARDING/ THE/ TO-DO/ LIST/,/ MR./ NISHIGUCHI/ WILL/ CREATE/ A/ DRAFT/ PROPOSAL/ OF/ SPECIFICATIONS/ BY/ THE/ 10-TH/ DAY/ OF/ THE/ MONTH/./
/MR/./ SAGAWA/,/ BY/ THE/ 8-TH/ DAY/ OF/ THE/ MONTH/,/ PLEASE/ CHECK/ WITH/ THE/ THIRD/ DEVELOPMENT/ DEPARTMENT/ ABOUT/ THE/ API/ OF/ THE/ Z/ MODULE/./
/MS/./ TAJIMA/,/ WE/ WILL/ LEAVE/ THE/ MEMORY/ USAGE/ REVIEW/ TO/ YOU/./ CAN/ IT/ BE/ COMPLETED/ BY/ NEXT/ WEEK/?/ OK/,/ BY/ THE/ 14-TH/ DAY/ OF/ THE/ MONTH/./
/WELL/,/ THE/ NEXT/ MEETING/ IS/ SCHEDULED/ ON/ FEBRUARY/ 14/ AT/ 10/ AM/ IN/ THE/ MEETING/ ROOM/ C/./
/THAT'S/ ENOUGH/ FOR/ TODAY/./ WE/ WILL/ END/ THE/ MEETING/./

FIG.6

| LET US SUMMARIZE | CONCLUSION |
|---|---|
| TO-DO LIST | TODO |
| THAT'S ENOUGH | TERMINATE |
| WE WILL END | TERMINATE |

FIG.7

| 10-TH DAY OF THE MONTH | DATE |
|---|---|
| NISHIGUCHI | PERSON |
| SPECIFICATIONS | OBJECT |
| SAGAWA | PERSON |
| Z MODULE | OBJECT |
| THIRD DEVELOPMENT DEPARTMENT | ORG |

FIG.8

| SPEAKER ID | A |
|---|---|
| MEETING DATE | 10/23/2015 |
| PARTICIPANTS | A, B, C, D |
| SERIES MEETING | TRUE |

FIG.9

```
<p ts="15:04:20">UM, WE ARE RUNNING OUT OF TIME.  <t class="CONCLUSION">LET US SUMMARIZE</t>.  IS IT OK WITH ALL?</p>
<p ts="15:04:25">FIRSTLY, REGARDING <t class="TODO">THE TO-DO LIST</t>, <person>MR. NISHIGUCHI</person> WILL <action>CREATE</action> <object>A DRAFT PROPOSAL</object> OF <object>SPECIFICATIONS</object> BY <date>THE 10-TH DAY OF THE MONTH</date>.</p>
<p ts="15:04:40"><person>MR. SAGAWA</person>, BY <date>THE 8-TH DAY OF THE MONTH</date>, PLEASE <action>CHECK</action> WITH <org>THE THIRD DEVELOPMENT DEPARTMENT</org> ABOUT <object>THE API</object> OF <object>THE Z MODULE</object>.</p>
<p ts="15:05:01"><person>MS. TAJIMA</person>, WE WILL LEAVE <object>THE MEMORY USAGE</object> <action>REVIEW</action> TO YOU.  CAN IT BE COMPLETED BY NEXT WEEK?  OK, BY <date>THE 14-TH DAY OF THE MONTH</date>.</p>
<p ts="15:05:10">WELL, THE NEXT <meeting>MEETING</meeting> IS SCHEDULED ON <date>FEBRUARY 14</date> AT <time>10 AM</time> IN <place>THE MEETING ROOM C</place>.</p>
<p ts="15:05:13">THAT'S ENOUGH FOR TODAY.  WE WILL END THE MEETING.</p>
```

SUMMARY GENERATING DEVICE, SUMMARY GENERATING METHOD, AND COMPUTER PROGRAM PRODUCT

CROSS-REFERENCE TO RELATED APPLICATIONS

This application is based upon and claims the benefit of priority from Japanese Patent Application No. 2016-054331, filed on Mar. 17, 2016; the entire contents of which are incorporated herein by reference.

FIELD

Embodiments described herein relate generally to a summary generating device, a summary generating method, and a computer program product.

BACKGROUND

Conventionally, with the improvement in the accuracy in the voice recognition technology, a system has been proposed in which the voice recognition technology is used for documenting the remarks made during a meeting. In such a situation, a technology is available that supports the creation of the minutes of a meeting, which typically requires time and efforts when created manually. For example, a technology is available that provides a minutes blueprint and performs analysis before creating the minutes according to the minutes blueprint.

However, in the conventional technology, the advance preparation for the purpose of creating the minutes is a cumbersome task. More particularly, in the conventional technology, since a minutes blueprint that is prepared in advance is used, the advance preparation for the purpose of creating the minutes becomes a cumbersome task.

BRIEF DESCRIPTION OF THE DRAWINGS

FIG. 4 is a diagram illustrating a result of performing voice recognition according to the embodiment;

FIG. 5 is a diagram illustrating a result of performing morphological analysis according to the embodiment;

FIG. 6 is a diagram illustrating command expressions according to the embodiment;

FIG. 7 is a diagram illustrating property information/meaning class of the parts of speech according to the embodiment;

FIG. 8 is a diagram illustrating system-originating information according to the embodiment;

FIG. 9 is a diagram illustrating a result of performing segmentalization according to the embodiment;

DETAILED DESCRIPTION

According to one embodiment, a summary generating device includes a featural script extracting unit, a segment candidate generating unit, and a structuring estimating unit. The featural script extracting unit extracts featural script information of the words included in text information. Based on the extracted feature script information, the segment candidate generating unit generates candidates of segments that represent the constitutional units for the display purpose. Based on the generated candidates of segments and based on an estimation model for structuring, the structuring estimating unit estimates structure information containing information organized from a comprehensive structure level to a local structure level.

Embodiment

Figure 1:
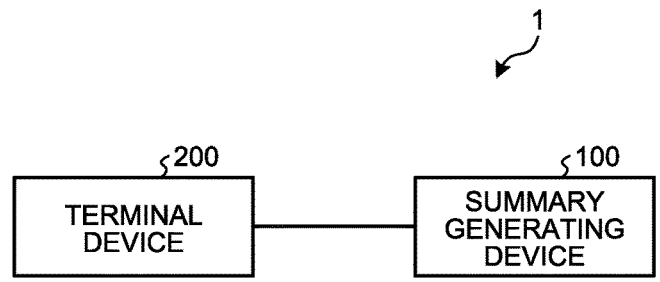
FIG. 1 is a diagram illustrating a system configuration of a summary generating system according to an embodiment.

FIG. 1 is a diagram illustrating an exemplary system configuration of a summary generating system 1 according to an embodiment. As illustrated in FIG. 1, the summary generating system 1 includes a summary generating device 100 and a terminal device 200. In the summary generating system 1, communication can be performed with each device in a wireless manner or a wired manner. Meanwhile, the summary generating system 1 can include a plurality of terminal devices 200. The summary generating system 1 creates, from voice data of a meeting, a summary document that is made visible as a format-structured text.

In the configuration described above, the terminal device 200 obtains voice data of a meeting and sends that voice data to the summary generating device 100 via a network. The voice data is obtained from a microphone that is connected to the terminal device 200. In a meeting, either a single microphone or a plurality of microphones can be used. Since there are times when a meeting is conducted across different locations, there may be a case in which the summary generating system 1 includes a plurality of terminal devices 200. Herein, the terminal device 200 is an information device such as a personal computer (PC) or a tablet terminal.

The summary generating device 100 obtains voice data from the terminal device 200, detects an explicit summary request of a speaker or an expression for a structuring request included in a speech, and estimates appropriate display units (segments). Then, in response to a termination instruction from a speaker, the summary generating device 100 rearranges the segments depending on the contents thereof, converts them into various display formats, and outputs them. Herein, the summary generating device 100 is an information processing device such as a server device.

Figure 2:
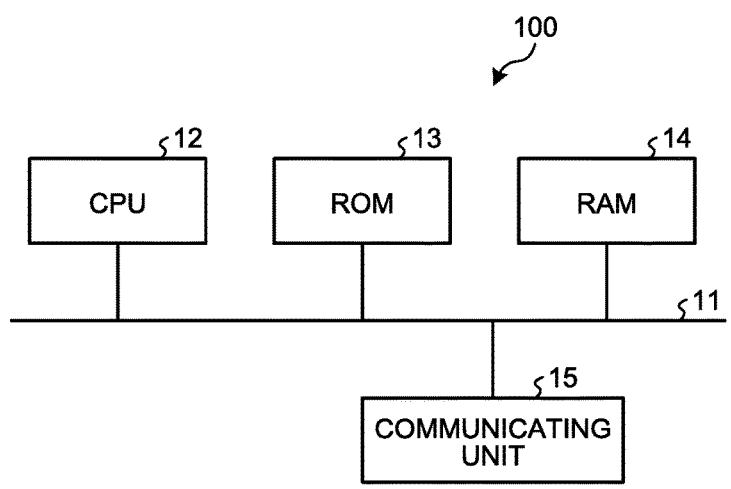
FIG. 2 is a block diagram illustrating a hardware configuration of a summary generating device according to the embodiment.

FIG. 2 is a block diagram illustrating an exemplary hardware configuration of the summary generating device 100 according to the embodiment. As illustrated in FIG. 2, the summary generating device 100 includes a central processing unit (CPU) 12, a read only memory (ROM) 13, a random access memory (RAM) 14, and a communicating unit 15. Moreover, these constituent elements are connected to each other by a bus 11.

The CPU 12 controls the operations of the entire summary generating device 100. The CPU 12 uses the RAM 14 as the work area and executes computer programs stored in the ROM 13 so as to control the operations of the entire summary generating device 100. The RAM 14 is used to temporarily store the information related to various operations, and is used as the work area during the execution of the computer programs stored in the ROM 13. Herein, the ROM 13 is used to store computer programs for implementing the operations of the summary generating device 100. The communicating unit 15 communicates with external devices such as the terminal device 200 via a network in a wireless manner or a wired manner. Meanwhile, the hardware configuration illustrated in FIG. 2 is only exemplary, and it is also possible to have a display unit for outputting the processing result and an operating unit for inputting a variety of information.

Figure 3:
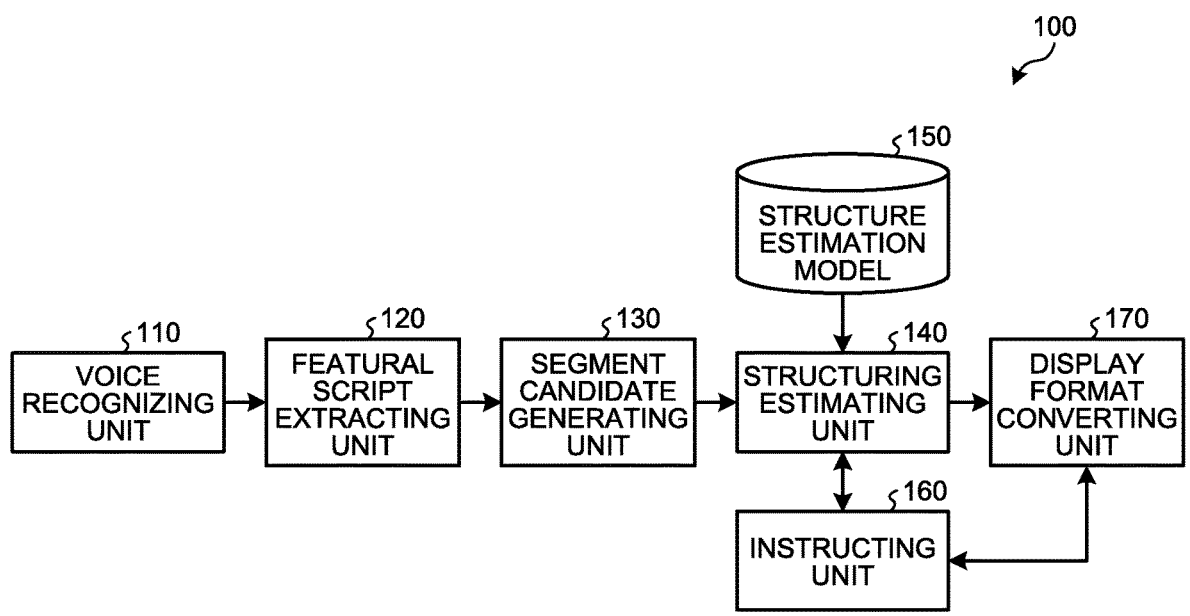
FIG. 3 is a block diagram illustrating a functional configuration of the summary generating device according to the embodiment.

FIG. 3 is a block diagram illustrating an exemplary functional configuration of the summary generating device 100 according to the embodiment. As illustrated in FIG. 3, the summary generating device 100 includes a voice recognizing unit 110, a featural script extracting unit 120, a segment candidate generating unit 130, a structuring estimating unit 140, an instructing unit 160, and a display format converting unit 170. Some or all of these constituent elements can be implemented using software (computer programs) or using hardware circuitry. Meanwhile the summary generating device 100 stores a structure estimation model 150 in the ROM 13.

The voice recognizing unit 110 performs a voice recognition operation with respect to voice data. More particularly, the voice recognizing unit 110 receives input of voice data that is sent from the terminal device 200. Then, the voice recognizing unit 110 performs a voice recognition operation, and generates text information containing character data of the utterances and information about the timings of utterances. FIG. 4 is a diagram illustrating an example of the result of performing voice recognition according to the embodiment. As illustrated in FIG. 4, the text information that represents the result of voice recognition contains character data of the utterances and information about the timings of utterances.

Moreover, the voice recognizing unit 110 identifies utterance sections and silent sections as the audio features of the voice data, and detects the duration of those sections. Meanwhile, the voice recognizing unit 110 may not be included in the summary generating device 100, and the configuration can be such that the featural script extracting unit 120 installed at latter stage performs operations based on the result of performing the voice recognition operation/ an audio feature extraction operation.

The featural script extracting unit 120 extracts featural script information included in the text information. More particularly, the featural script extracting unit 120 performs morphological analysis with respect to the text information generated by the voice recognizing unit 110. FIG. 5 is a diagram illustrating an example of the result of performing morphological analysis according to the embodiment. As illustrated in FIG. 5, as a result of performing morphological analysis, the text is divided into the smallest linguistic units each carrying a meaning. Then, the featural script extracting unit 120 identifies part-of-speech information included in the text information, and performs meaning class analysis.

In the case of nouns, more detailed information (for example, information such as personal names or dates) based on the corresponding property information is extracted as featural script information. For example, during meaning class analysis, the following is extracted as featural script information: presence or absence of expressions of quantity and expressions of units, personal names and organization names, event names, and keywords such as technical terms. In other words, the featural script information, according to some embodiments, is information related to parts of speech that are divisions in accordance with, for example, a morphological analysis. Then, the featural script extracting unit 120 performs logical element determination with respect to the text information. For example, in the logical element determination, it is determined whether or not ordered bullet point expressions or command expressions for structuring are included in the text information. If logical elements are included in the text information, then the featural script extracting unit 120 assigns their metadata to the logical elements.

FIG. 6 is a diagram illustrating exemplary command expressions according to the embodiment. As illustrated in FIG. 6, the command expressions include "let us summarize (conclusion)", "to-do list (todo)", "that's enough (terminate)", and "we will end (terminate)". FIG. 7 is a diagram illustrating an example of the property information/ the meaning class of the parts of speech according to the embodiment. As illustrated in FIG. 7, for the term "10-th day of the month", "date" represents the property information/ the meaning class of a part of speech. Similarly, for the term "Nishiguchi", "person" represents the property information/ the meaning class of a part of speech.

Subsequently, the featural script extracting unit 120 performs segment label determination with respect to the text information. A segment label is the name expressing the role of a segment (a display unit), and represents metadata that is assigned depending on whether or not the following is included: the meaning class/the property information of a part of speech extracted at an earlier stage, or the text of an utterance not having the meaning class/the property information, or a command (instruction) for structuring. For example, a command for structuring represents an instruction to start structuring, and examples thereof include "start of bullet points", "table begins here", or "tabular format begins here". Moreover, the featural script extracting unit 120 assigns utterance sections and silent sections, which are detected by the voice recognizing unit 110, as surrounding information.

Meanwhile, as the featural script information, information originating from the summary generating system 1 can also be used. For example, as the featural script information, the featural script extracting unit 120 obtains the following system-originating information if available: detection of a speaker ID based on the login user of a microphone or the connected terminal device 200; meeting information such as the meeting title referable to in tandem with the usage timing of the meeting room and the scheduler, the time of the meeting, the participants, and the meeting room; and detailed meeting information such as information on the individual speakers who input voice during the meeting. FIG. 8 is a diagram illustrating an example of system-originating information according to the example. As illustrated in FIG. 8, in the system-originating information, "A" represents the "speaker ID" and "10/23/2015" represents the "meeting date".

The segment candidate generating unit 130 generates variation in the candidates of smallest constitutional units for structuring. Examples of the candidates for smallest constitutional units for structuring include, in descending order of granularity, character strings partitioned by units such as speakers, paragraphs, phrases, sequences of the same character type such as Kanji or Katakana, meaning classes, words, and parts of speech. More particularly, the segment candidate generating unit 130 reads the text information generated by the voice recognizing unit 110 and reads the featural script information extracted by the featural script extracting unit 120. Then, the segment candidate generating unit 130 detects the segment label present in each set of featural script information. For example, in the segment label detection; a start instruction, a termination instruction, or a label providing a clue of structuring is detected.

Then, the segment candidate generating unit 130 performs grouping of the sets of featural script information that have been read and stored before. For example, in the grouping, repetition of regular appearances of similar elements is detected or the appearance patterns of featural script information having different types are detected, and the units of such repetitions are grouped together. As an example, similar elements point to regular appearance of repetition of the elements (three elements) such as date, location, and arbitrary text.

Meanwhile, if a termination instruction regarding structuring is included in a segment label, then the segment candidate generating unit 130 performs ordering of the sets of featural script information that have been grouped before. Examples of ordering include the following methods: a method in which the ordering of the types of featural script is defined in advance and then the ordering is defined in a fixed manner; a method in which, in a specific example of the extracted featural script information, the ordering is performed based on the character length (average character length) included in each featural script; and a method in which the ordering is performed based on the inclusion number of a particular element (meaning class).

FIG. 9 is a diagram illustrating an example of the result of performing segmentalization according to the embodiment. As illustrated in FIG. 9, segmentalization results in the generation of text information that is assigned with the command expressions included in the text at each timing, the property information/the meaning class of the parts of speech, and the system-originating information.

The structuring estimating unit 140 estimates structure information based on the segment information. More specifically, the structuring estimating unit 140 reads the segment information generated by the segment candidate generating unit 130. Then, the structuring estimating unit 140 reads a structure estimation model from the structure estimation model 150. Herein, the structure estimation model is obtained by learning, as learning data, the exemplary formats suitable for display and the results edited/decided in the past. Based on such a structure estimation model; the structuring estimating unit 140 assigns combinations and patterns of appearances of the featural script information, and presents suitable structuring candidates in an ordered manner. In the initial presentation of the structure information, the structuring result having the highest likelihood is presented from among the ordered segment patterns.

Then, the structuring estimating unit 140 receives a decision instruction from a user. Herein, the instruction from the user is received via the instructing unit 160. For example, if the user has no issue with the current presentation candidates, a structuring result with the decided presentation candidates is presented. On the other hand, if a decision instruction from the user cannot be obtained (i.e., if a request for presentation of the next candidate is received), then the next structuring result is presented. In the case of presenting the next structuring result, the presentation can be done not only by changing the combination of segments but also by changing the variation by tracking back the manner of retrieval of the segments. Meanwhile, the presentation of the structuring result either can be output from the terminal device 200 or can be output from the summary generating device 100.

Figure 10:
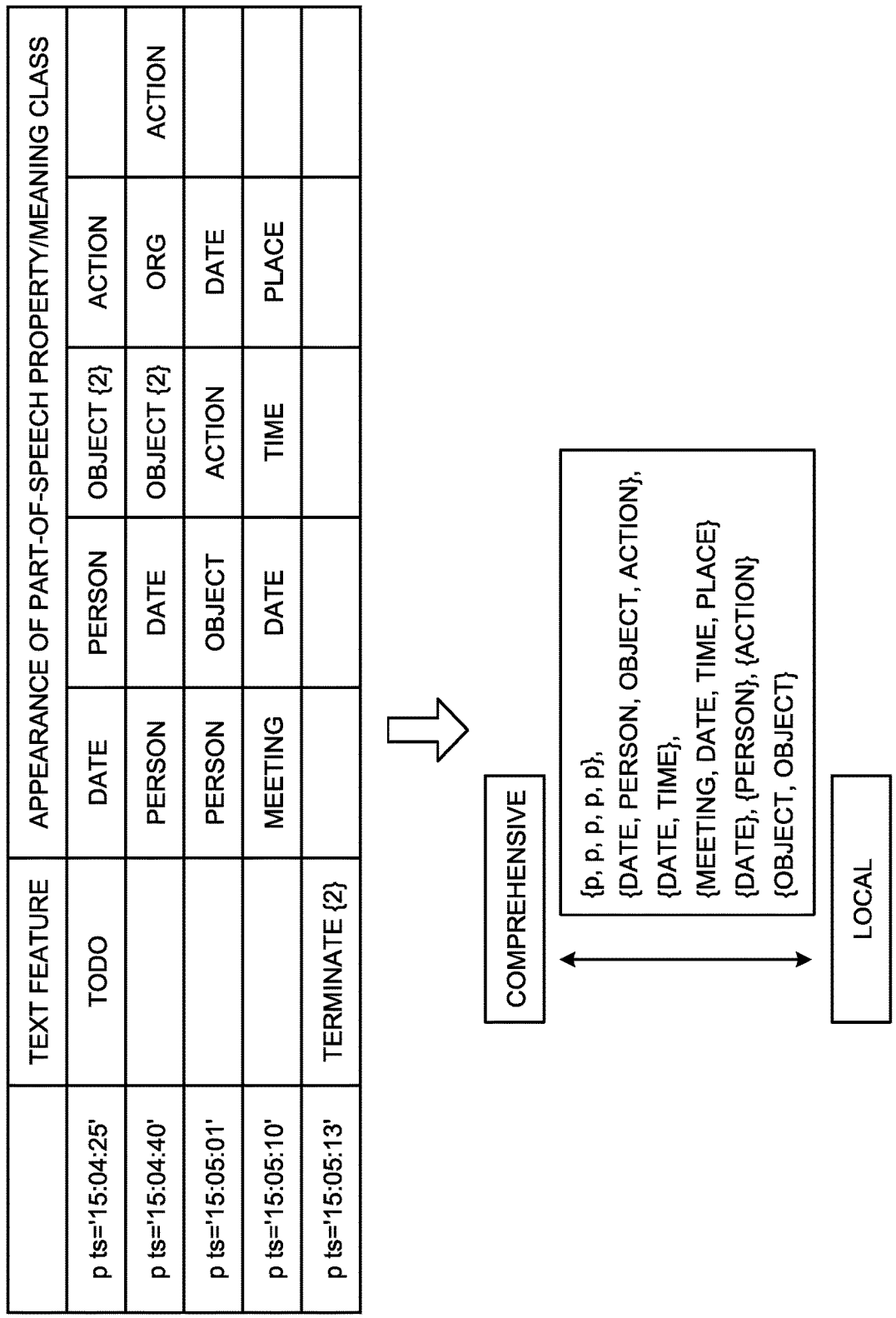
FIG. 10 is a diagram for explaining the extraction of candidates of structuring estimation according to the embodiment.

FIG. 10 is a diagram for explaining an example of extracting candidates of structuring estimation according to the embodiment. As illustrated in FIG. 10, based on the segment information, the structuring result includes information ranging from information of a comprehensive structure level to information of a local structure level. For example, the comprehensive structure level and the local structure level according to the embodiments represent the tier of a document, such as chapters, sections, paragraphs, itemization, and titles and main text, and may be called as a "logical structure" or "logical element" of a document. In a hierarchy of structural elements, the comprehensive structure level may represent the highest or broadest structure element/elements while the local structure level may represent the lowest or narrowest structure element/elements. For example, if a document is divided into chapters, section, and paragraphs, the comprehensive structure level may be the document itself or the chapters, and the local structure element may be the paragraphs.

The display format converting unit 170 converts the decided structuring result into a display format for user viewing. More particularly, the display format converting unit 170 reads the structuring result decided by the structuring estimating unit 140. Then, the display format converting unit 170 reads a display format conversion model. In the display format conversion model, definition patterns regarding the display format to be used for presentation are written corresponding to the structuring results; and the cascading style sheets (CSS) or the XSL transformations (XSLT) can be used for writing the definition patterns.

Subsequently, the display format converting unit 170 presents the initial conversion result according to the structuring result and the display format conversion model. In response to that presentation, if a decision instruction is received from the user via the instructing unit 160, then the display format converting unit 170 outputs the conversion result as a summary document. On the other hand, if a decision instruction from the user cannot be obtained (i.e., if a request for presentation of the next candidate is received), then the conversion result having the next highest likelihood is presented. Meanwhile, the presentation of the conversion result either can be output from the terminal device 200 or can be output from the summary generating device 100.

Figure 11:
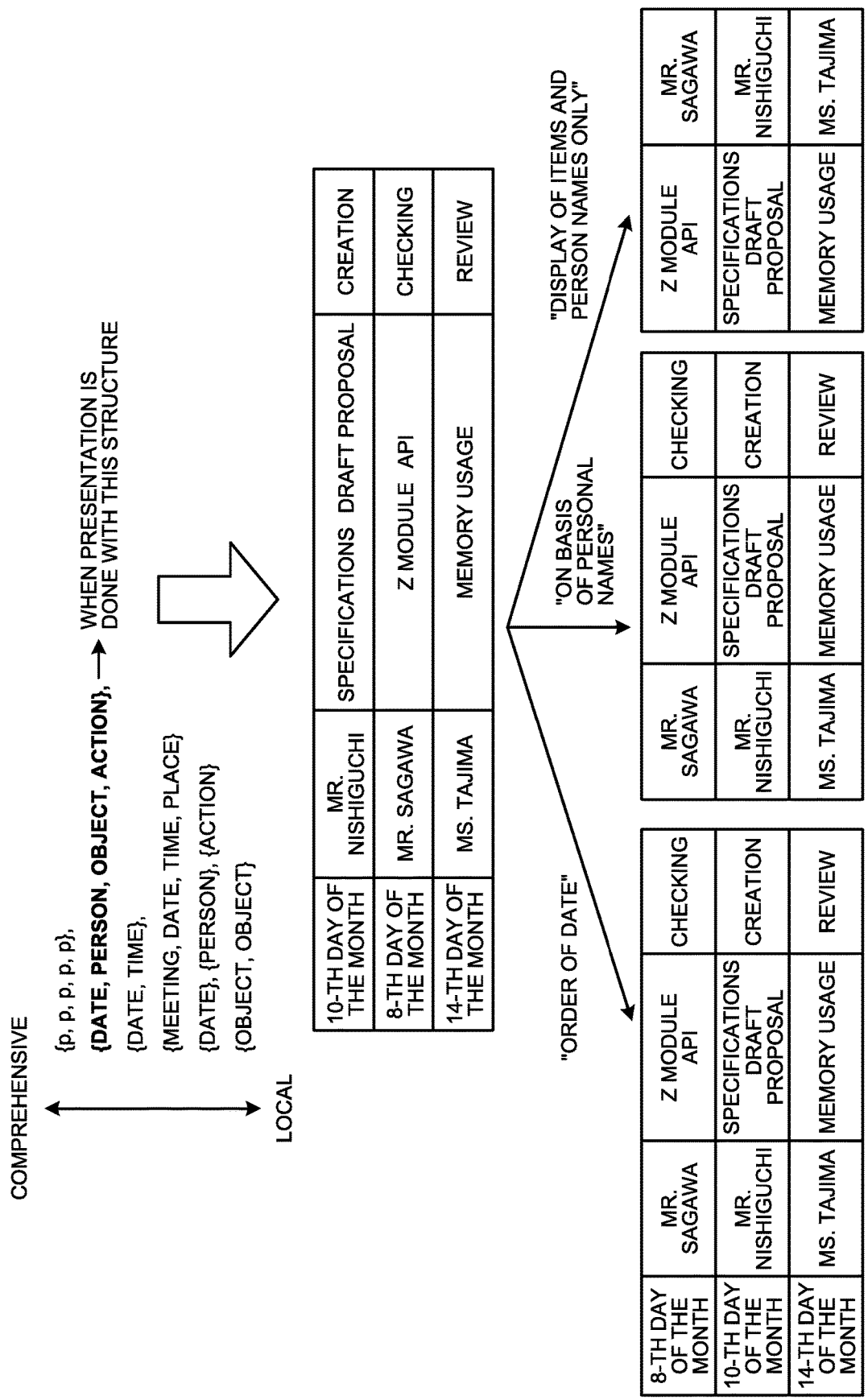
FIG. 11 is a diagram for explaining about candidates of the display format according to the embodiment.

FIG. 11 is a diagram for explaining an example of candidates of the display format according to the embodiment. As illustrated in FIG. 11, in the case of presenting the information of any one of the structures from among the structuring results, the display is done in the order of date, or the display is done on the basis of personal names, or only the items and the personal names are displayed.

Figure 12:
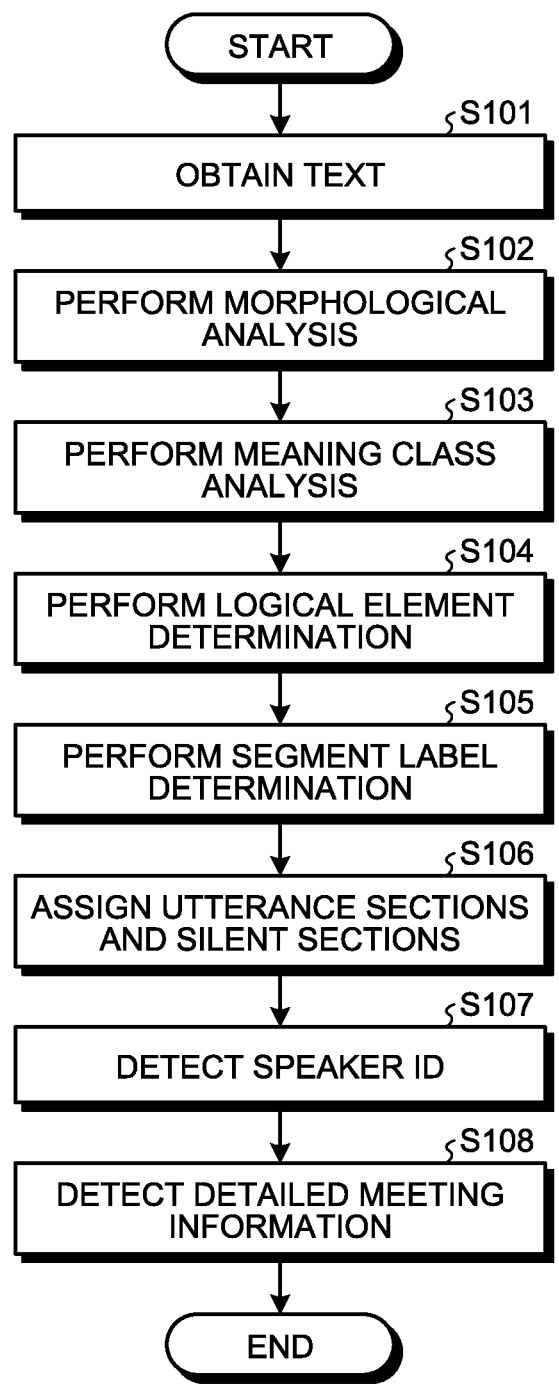
FIG. 12 is a flowchart for explaining a sequence of operations performed by a featural script extracting unit according to the embodiment.

FIG. 12 is a flowchart for explaining an exemplary sequence of operations performed by the featural script extracting unit 120 according to the embodiment. As illustrated in FIG. 12, the featural script extracting unit 120 obtains the text information generated by the voice recognizing unit 110 (Step S101). Then, the featural script extracting unit 120 performs morphological analysis with respect to the obtained text information (Step S102). Subsequently, the featural script extracting unit 120 identifies part-of-speech information included in the text information and performs meaning class analysis (Step S103). Then, the featural script extracting unit 120 performs logical element determination with respect to the text information (Step S104).

Subsequently, the featural script extracting unit 120 performs segment label determination with respect to the text information (Step S105). Then, the featural script extracting unit 120 assigns utterance sections and silent sections, which are detected by the voice recognizing unit 110, as surrounding information (Step S106). Subsequently, the featural script extracting unit 120 detects, as system-originating information, a speaker ID based on the login user of a microphone or the terminal device 200 (Step S107). Then, the featural script extracting unit 120 detects detailed meeting information managed by an external device (Step S108).

Figure 13:
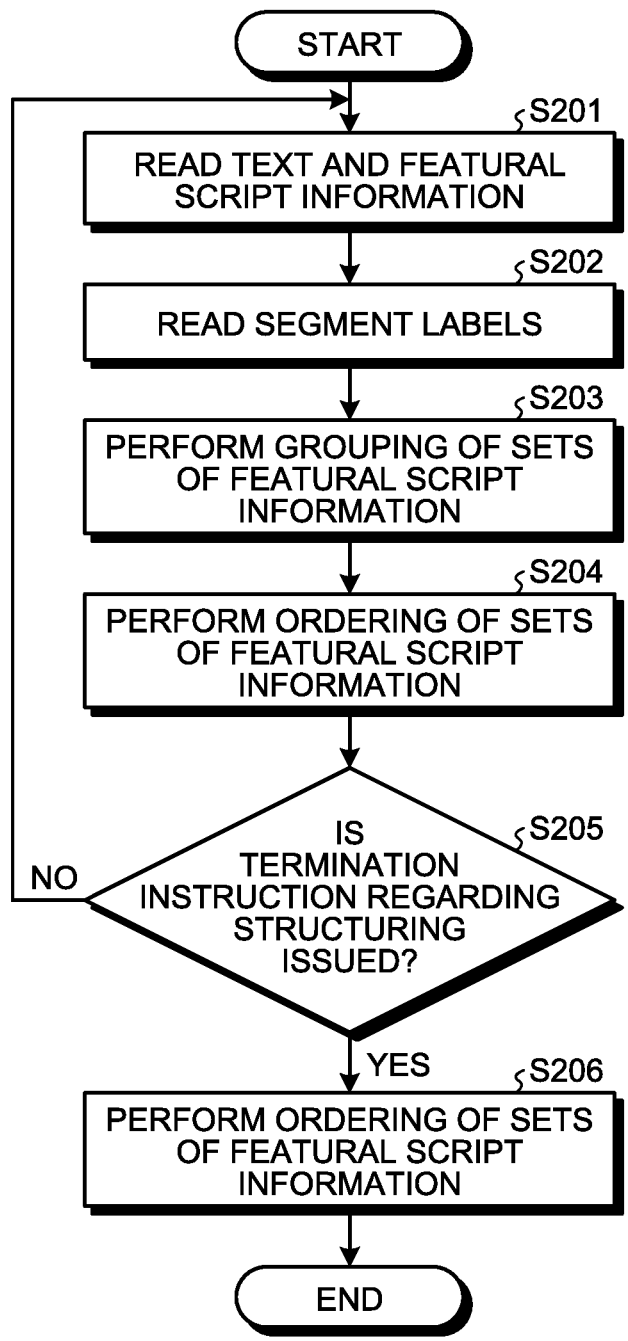
FIG. 13 is a flowchart for explaining a sequence of operations performed by a segment candidate generating unit according to the embodiment.

FIG. 13 is a flowchart for explaining an exemplary sequence of operations performed by the segment candidate generating unit 130 according to the embodiment. As illustrated in FIG. 13, the segment candidate generating unit 130 reads the text information generated by the voice recognizing unit 110 and reads the featural script information extracted by the featural script extracting unit 120 (Step S201). Then, the segment candidate generating unit 130 reads the segment label included in each set of featural script information (Step S202). Subsequently, the segment candidate generating unit 130 performs grouping of sets of featural script information that have been read and stored before (Step S203). Then, the segment candidate generating unit 130 performs ordering of the sets of featural script information that have been grouped till that point of time (Step S204).

Subsequently, the segment candidate generating unit 130 determines whether or not a termination instruction regarding structuring is included in the segment label (Step S205). If a termination instruction regarding structuring is included in the segment label (Yes at Step S205), then the segment candidate generating unit 130 performs ordering of the sets of featural script information that have been grouped (Step S206). However, if a termination instruction regarding structuring is not included in the segment label (No at Step S205), then the system control returns to Step S201.

Figure 14:
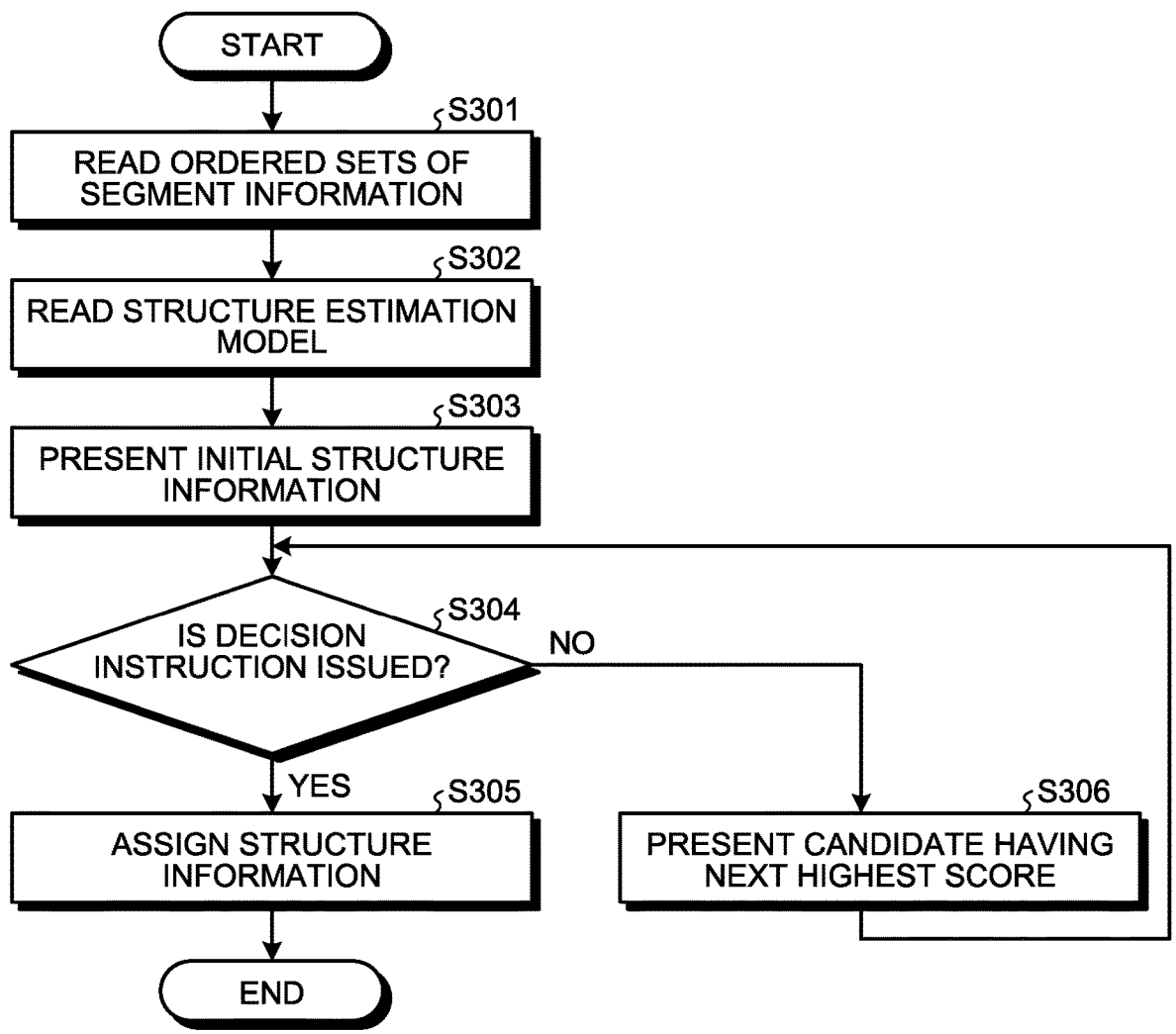
FIG. 14 is a flowchart for explaining a sequence of operations performed by a structuring estimating unit according to the embodiment.

FIG. 14 is a flowchart for explaining an exemplary sequence of operations performed by the structuring estimating unit 140 according to the embodiment. As illustrated in FIG. 14, the structuring estimating unit 140 reads the ordered sets of segment information generated by the segment candidate generating unit 130 (Step S301). Then, the structuring estimating unit 140 reads a structure estimation model from the structure estimation model 150 (Step S302). Subsequently, based on the segment information and the structuring estimation model, the structuring estimating unit 140 assigns combinations and patterns of appearances of the featural script information, and presents the initial structure information (a candidate for structuring) (Step S303).

When a decision instruction is received from the user in response to the presentation of structure information (Yes at Step S304), the structuring estimating unit 140 assigns the presented candidate as the decided structure information (Step S305). However, if a decision instruction cannot be received from the user in response to the presentation of structure information (i.e., if a request for presentation of the next candidate is received) (No at Step S304), then the structuring estimating unit 140 presents the candidate of the structure information having the next highest score (Step S306). After a candidate is presented, the system control returns to Step S304 and a decision instruction from the user is awaited.

Figure 15:
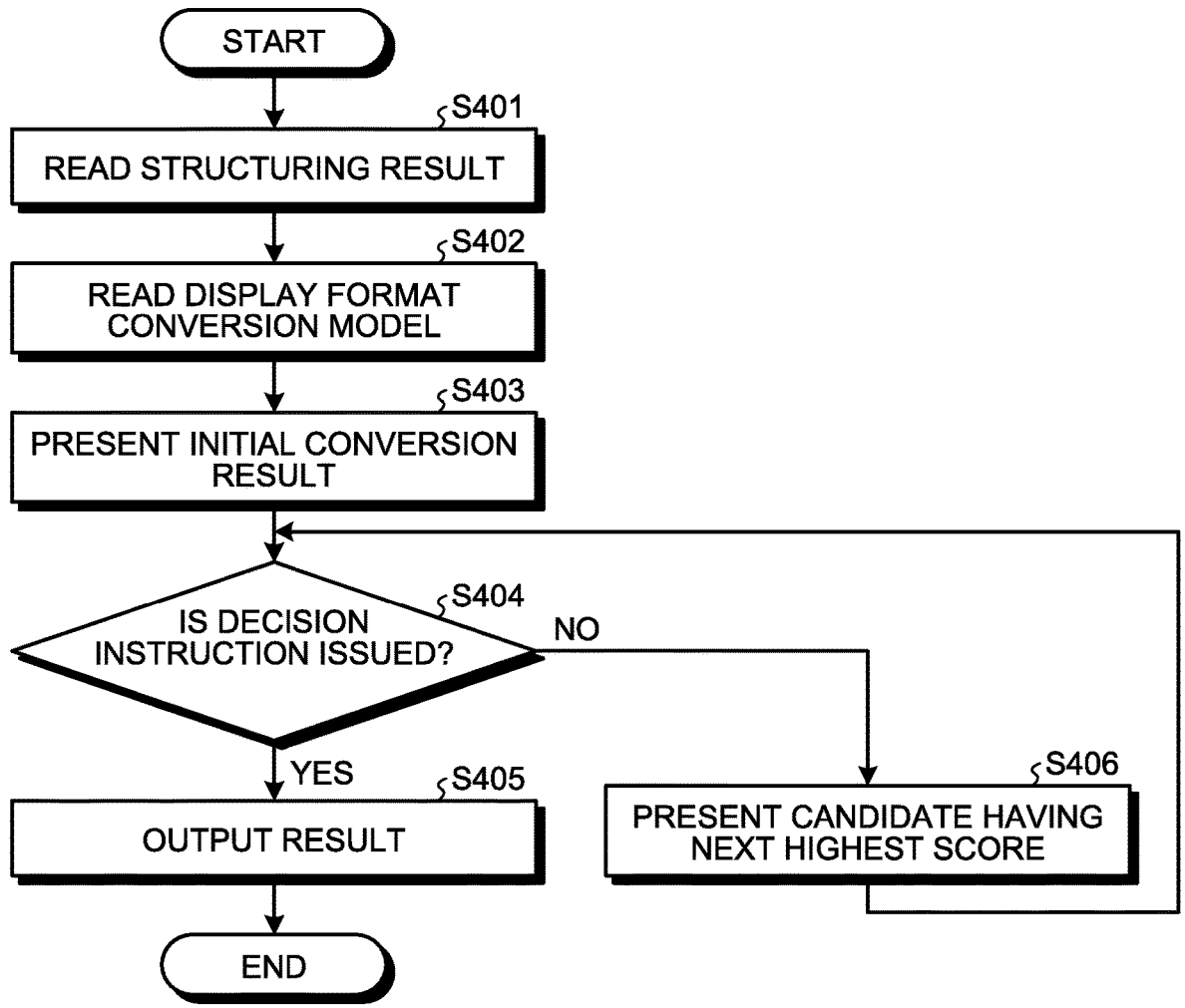
FIG. 15 is a flowchart for explaining a sequence of operations performed by a display format converting unit according to the embodiment.

FIG. 15 is a flowchart for explaining an exemplary sequence of operations performed by the display format converting unit 170 according to the embodiment. As illustrated in FIG. 15, the display format converting unit 170 reads the structuring result decided by the structuring estimating unit 140 (Step S401). Then, the display format converting unit 170 reads the display format conversion model (Step S402). Subsequently, according to the structuring result and the display format conversion model, the display format converting unit 170 presents the initial conversion result (Step S403).

Subsequently, when a decision instruction from the user is received in response to the presentation of the conversion result (Yes at Step S404), the display format converting unit 170 outputs the conversion result as a summary document (Step S405). However, if a decision instruction from the user cannot be received in response to the presentation of the conversion result (i.e., if a request for presentation of the next candidate is received) (No at Step S404), then the display format converting unit 170 presents the candidate having the next highest score of the conversion result (Step S406). After the candidate is presented, the system control returns to Step S404 and a decision instruction from the user is awaited.

According to the embodiment, from the result of voice recognition performed with respect to voice data, segments are estimated based on an explicit instruction by the speaker or based on an expression for a structuring request. Then, the segments are rearranged depending on the contents thereof and are presented upon being converted into various display formats. As a result, it becomes possible to cut down on the time and efforts required for advance preparation.

Meanwhile, the summary generating device 100 according to the embodiment can be implemented using, for example, a general-purpose computer device serving as the basic hardware. The computer programs that are executed contain modules for the constituent elements described above. The computer programs can be provided by recording as installable files or executable files in a computer-readable recording medium such as a compact disk read only memory (CD-ROM), a compact disk recordable (CD-R), or a digital versatile disk (DVD); or can be provided by storing in advance in a ROM.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A summary generating device comprising:
   a memory; and
   one or more processors configured to function as a featural script extracting unit, a segment candidate generating unit and a structuring estimating unit, wherein
   the featural script extracting unit extracts featural script information from text information, the featural script information including at least one of a part-of-speech and metadata of a logical element included in the text information, property information of the part-of-speech, and system information related to the summary generating system;

the segment candidate generating unit generates, based at least in part on the extracted featural script information, candidates of segments representing constitutional units for display, and performs ordering of sets of the featural script information; and a structuring estimating unit estimates structure information comprising structural elements based at least in part on the generated candidates of segments and a structure estimation model, the structural elements comprising a comprehensive structural element that has a comprehensive structure level and a local structural element that has a local structure level, the comprehensive structure level representing a broadest structural element within a hierarchy of the structural elements and the local level representing a narrowest structural element within the hierarchy of the structural elements, the structure estimation model including learning data obtained by learning display formats suitable for displaying and summary results edited or decided prior to the estimation, wherein, the structuring estimating unit presents a structural element of the structural elements having a likelihood that is higher than another structure element of the structural elements, the likelihood being the likelihood with respect to the estimation model.

2. The summary generating device according to claim 1, wherein
the one or more processors is configured to further function as a voice recognizing unit,
the voice recognizing unit performs voice recognition with respect to voice data and generates the text information based on the voice recognition of the voice data, and
the featural script extracting unit extracts featural script of words included in the generated text information.

3. The summary generating device according to claim 2, wherein
the voice recognizing unit generates the text information to include character information of utterances and timings of the utterances, and extracts audio features of the voice data, and
the featural script extracting unit extracts timings corresponding to the character information and extracts the audio features as surrounding information with respect to the words.

4. The summary generating device according to claim 1, wherein
the one or more processors is configured to further function as a display format converting unit, and
the display format converting unit converts the estimated structure information into a display format for viewing.

5. The summary generating device according to claim 4, wherein the display format converting unit changes the display format according to a user instruction.

6. The summary generating device according to claim 1, wherein the segment candidate generating unit performs the ordering of the sets of the featural script information based at least in part on at least one of a character length of each featural script or an inclusion number of specific elements.

7. A summary generating method implemented by a summary generating device including a memory and one or more processors configured to function as a featural script extracting unit, a segment candidate generating unit and a structuring estimating unit, the summary generating method comprising:

extracting, by the featural script extracting unit, featural script information of words from text information, the featural script information including at least one of a part-of-speech and metadata of a logical element included in the text information, property information of the part-of-speech, and system information related to the summary generating system;

generating, by the segment candidate generating unit, based at least in part on the extracted featural script information;

estimating, by the structuring estimating unit, based at least in part on the generated candidates of segments and a structure estimation model, structure information comprising structural elements comprising a comprehensive structural element that has a comprehensive structure level and a local structural element that has a local structure level, the comprehensive structure level representing a broadest structural element within a hierarchy of the structural elements the local level representing a narrowest structural element within the hierarchy of the structural elements, the structure estimation model including learning data obtained by learning display formats suitable for displaying and summary results edited or decided prior to the estimation; and performing ordering of sets of the featural script information, wherein, the structuring estimating unit presents a structural element of the structural elements having a likelihood that is higher than another structure element of the structural elements, the likelihood being the likelihood with respect to the estimation model.

8. The summary generating method according to claim 7, wherein said performing ordering of the sets of the featural script information comprises performing ordering of the sets of the featural script information based at least in part on at least one of a character length of each featural script or an inclusion number of specific elements.

9. A computer program product comprising a non-transitory computer readable medium that comprises a summary generating program, wherein the summary generating program, when executed by a computer, causes the computer to perform:

extracting featural script information of words from text information, the featural script information including at least one of a part-of-speech and metadata of a logical element included in the text information, property information of the part-of-speech, and system information related to the summary generating system;

generating, based at least in part on the extracted featural script information, candidates of segments representing constitutional units for display;

estimating, based at least in part on the generated candidates of segments and a structure estimation model, structure information comprising structure elements comprising a comprehensive structural element that has a comprehensive structure level and a local structural element that has a local structure level, the comprehensive structure level representing a broadest structural element within a hierarchy of the structural elements and the local level representing a narrowest structural element within the hierarchy of the structural elements, the structure estimation model including learning data obtained by learning display formats suitable for displaying and summary results edited or decided prior to the estimation; and performing ordering of sets of the featural script information, wherein, the structuring estimating unit presents a structural element of the structural elements having a likelihood that is higher than another structure element of the structural elements, the likelihood being the likelihood with respect to the estimation model.

10. The summary generating program according to claim 9, wherein said performing ordering of the sets of the featural script information comprises performing ordering of the sets of the featural script information based at least in part on at least one of a character length of each featural script or an inclusion number of specific elements.

* * * * *